(12) United States Patent
Jadhav et al.

(10) Patent No.: US 10,678,879 B2
(45) Date of Patent: Jun. 9, 2020

(54) METHOD AND SYSTEM FOR SELECTING SAMPLE SET FOR ASSESSING THE ACCESSIBILITY OF A WEBSITE

(71) Applicant: Tata Consultancy Services Limited, Mumbai (IN)

(72) Inventors: Charudatta Jadhav, Mumbai (IN); Syed Absar Ahmad, Mumbai (IN); Tanaz Farokh Yazdani, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 182 days.

(21) Appl. No.: 15/457,711

(22) Filed: Mar. 13, 2017

(65) Prior Publication Data

US 2017/0277804 A1  Sep. 28, 2017

(30) Foreign Application Priority Data

Mar. 23, 2016  (IN) .............................. 201621010152

(51) Int. Cl.
*G06F 16/00* (2019.01)
*G06F 16/957* (2019.01)
*G06F 16/951* (2019.01)
*G06F 16/958* (2019.01)

(52) U.S. Cl.
CPC .......... *G06F 16/957* (2019.01); *G06F 16/951* (2019.01); *G06F 16/958* (2019.01)

(58) Field of Classification Search
CPC ..... G06F 16/951; G06F 16/957; G06F 16/958
See application file for complete search history.

(56) References Cited

U.S. PATENT DOCUMENTS

| | | | |
|---|---|---|---|
| 2007/0038655 A1* | 2/2007 | Bronstad | G06F 17/30864 |
| 2009/0150448 A1* | 6/2009 | Lechner | G06F 16/9535 |
| 2010/0131797 A1* | 5/2010 | Ganesh | G06F 11/34 714/21 |
| 2010/0186088 A1* | 7/2010 | Banerjee | G06F 21/51 726/23 |
| 2010/0199215 A1* | 8/2010 | Seymour | G06F 3/0481 715/808 |

FOREIGN PATENT DOCUMENTS

CN         103279548 A         9/2013

* cited by examiner

*Primary Examiner* — Dinku W Gebresenbet
(74) *Attorney, Agent, or Firm* — Finnegan, Henderson, Farabow, Garrett & Dunner LLP

(57) ABSTRACT

A method and system is provided for selecting a sample set of pages for assessing the accessibility of a websites. The sample set of pages are selected in such a way that a minimum set of pages can represent the whole websites as per the standard compliance. The system includes a crawler which scans the complete websites. Further an element identification module identifies a set of web elements present on the websites. The web elements and the webpages are then classified into a predefined categories. The system also provides a rule based engine to generate the sample set of pages based on a predefined rule. The generated sample set of pages are used to assess the accessibility of the websites.

9 Claims, 3 Drawing Sheets

METHOD AND SYSTEM FOR SELECTING SAMPLE SET FOR ASSESSING THE ACCESSIBILITY OF A WEBSITE

CROSS-REFERENCE TO RELATED APPLICATIONS AND PRIORITY

The present application claims priority from Indian complete specification no. 201621010152 filed on 23 Mar. 2016, the complete disclosure of which, in its entirety is herein incorporated by references.

TECHNICAL FIELD

The present application generally relates to the field of sample accessibility assessment. More particularly, the application provides a method and system for selecting a sample set of pages for assessing the accessibility of a websites such that the sample set of pages give 100% coverage of the unique elements and functionalities present in the website.

BACKGROUND

In order to enable persons with disabilities to obtain accessible online experience websites must meet the requirements of accessibility standards such as WCAG 2.0. Web Content Accessibility Guidelines (WCAG) 2.0 covers a wide range of recommendations for making web content more accessible. Following these guidelines will make content accessible to a wider range of people with disabilities, including blindness and low vision, deafness and hearing loss, learning disabilities, cognitive limitations, limited movement, speech disabilities, photosensitivity and combinations of these. The websites must help all kinds of people with disabilities access to various public accessibility of information services. It has been observed that now a days a websites is created in manner such that users with disabilities can also access the websites without other assistance. In order to facilitate web accessibility to the users with disabilities, it is essential to assess the web accessibility of the websites before the websites is deployed on a server. Since a web-page of the websites contains a plurality of web elements of distinct behavior, one of the essential steps for assessing the web accessibility is to identify each web element correctly present on the web-page.

In addition to the basic web elements, there are some other web elements, hereinafter referred to as complex web elements, present on the web-page which cannot be identified based on the structure and the semantics of the HTML code. Examples of the complex web elements may include, but not limited to, a menubar, a treeview, and a captcha. It is to be understood that the complex web elements cannot directly inference from the HTML or the HTML DOM because the complex web elements do not have a defined structure or semantic of the HTML code. Hence, the complex web elements are interpreted as the basic web elements and are assessed in the same manner as the basic web elements are assessed by the traditional methods.

Recent trends in regulatory area, mainly amendment of laws in several countries regarding accessibility compliance, a huge momentum in accessibility work across globe has been noticed. A lot of work is going on for integrating accessibility into live IT products, solutions and websites. Typical activities in such assignment are assessing the accessibility compliance and identify the defects followed by issuer remediation, accessibility validation and final check.

The number of screens/pages in IT products or websites varies from few hundreds to few thousands. Accessibility assessment is primarily a manual work (70%), on an average single page assessment needs few hours' efforts (ranging 3 to 7 hours). Performing two rounds of testing for such a huge number of pages need considerable amount of efforts and intern cost.

To mitigate this challenge, IT industry widely use best practice/method of 'sample assessment', during first cycle of testing few sample screens/pages selected for testing which could give close to 100% coverage of applicable accessibility guidelines for a project. This help in reduction in efforts up to 60% in first testing cycle. But to find of the sample pages for testing from thousands of pages need human judgment and manual intervention, hence required extensive manual efforts to identify these pages resulting in high costs. Additionally, on some occasions, there are high possibilities that human may not be able to identify all the unique pages accurately with given complexity and constrains.

One of the existing method uses web page classification based on document structure. It proposes a method for classification of pages into three broad categories—information, research and personal. The aim is to get an estimate of the type of data available on a websites. Another method uses sampling of pages uniformly from the World Wide Web. It proposes two algorithms for generating randomly uniform sample set of web pages from the World Wide Web. The aim is to sample and index pages to be used by a search engines. Several attempts have been made to categorize the web pages with varying degree of success. None of the method have been convincing enough to be used for assessing the accessibility of websites.

SUMMARY

Embodiments of the present disclosure present technological improvements as solutions to one or more of the above-mentioned technical problems recognized by the inventors in conventional systems The present disclosure provides a system for selecting a sample set of pages for assessing the accessibility of a websites. The system is configured to select a minimum number of sample set of pages such that they can represent the whole websites for assessing the accessibility. The selected sample set of pages provide 100% coverage of the unique elements and functionalities present in the websites. The selected sample set of pages then used to test the websites for accessibility requirements. The system comprises a memory and a processor coupled to the memory. The processor further comprises a crawler module, an element identification module, a classification module, an intelligence based module and a rule based engine. The crawler module scans a plurality of webpages present in the websites. The crawler module results in the generation of a set of information. The element identification module identifies a set of web elements present on the plurality of webpages based on the set of information. The classification module classifies each of the plurality of webpages in to one of a predefined categories. The intelligence based module configured classifies the set of web elements into one of the predefined categories based on importance from an accessibility point of view and user interaction. The rule based engine generates the sample set of pages based on a predefined rule. The predefined rule is constructed based on the predefined categories. The sample set of pages contains a combination of various web elements and the plurality of webpages.

The present disclosure also provides a method for selecting a sample set of pages for assessing the accessibility of a websites. Initially, a plurality of webpages present in the websites are scanned using the crawler module. The scanning results in generation of a set of information. In the next step a set of web elements present on the plurality of webpages are identified based on the set of information using the element identification module. In the next step, each of the plurality of webpages are classified into one of a predefined categories using the classification module. And the set of web elements are classified into one of the predefined categories based on importance from an accessibility point of view and user interaction using the intelligence based module. Finally, the sample set of pages are generated based on a predefined rule using a rule based module. The predefined rule is constructed based on the predefined categories. The sample set of pages contains a combination of various web elements such that a minimum number of sample set of pages can represent each element present in the plurality of webpages of the whole websites.

In another embodiment, a non-transitory computer-readable medium having embodied thereon a computer program for selecting a sample set of pages for assessing the accessibility of a websites. Initially, a plurality of webpages present in the websites are scanned using the crawler module. The scanning results in generation of a set of information. In the next step a set of web elements present on the plurality of webpages are identified based on the set of information using the element identification module. In the next step, each of the plurality of webpages are classified into one of a predefined categories using the classification module. And the set of web elements are classified into one of the predefined categories based on importance from an accessibility point of view and user interaction using the intelligence based module. Finally, the sample set of pages are generated based on a predefined rule using a rule based module. The predefined rule is constructed based on the predefined categories. The sample set of pages contains a combination of various web elements such that a minimum number of sample set of pages can represent each element present in the plurality of webpages of the whole websites.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Figure 1:
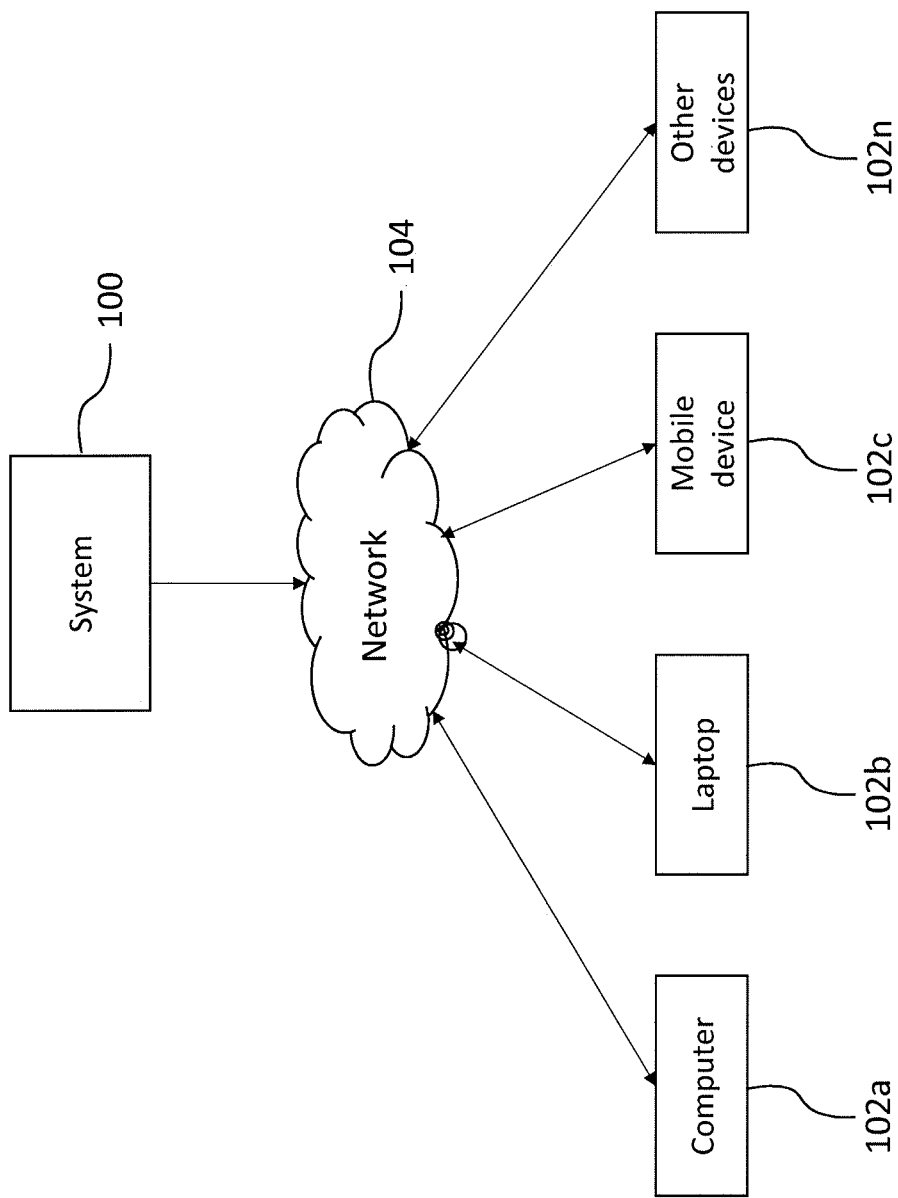
FIG. 1 shows a network implementation of a system for selecting sample set of webpages for assessing the accessibility of a websites in accordance with an embodiment of the disclosure.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Figure 2:
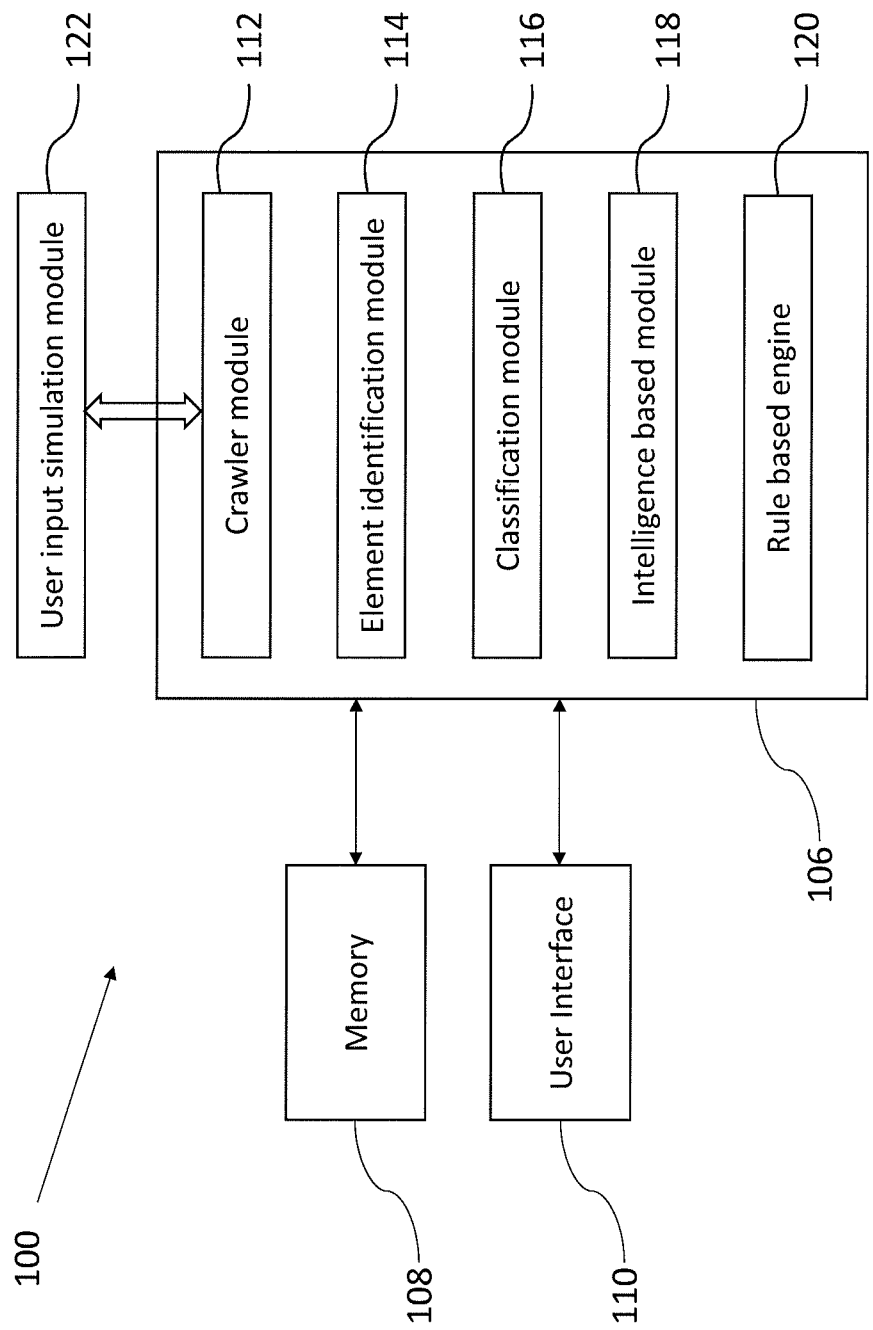
FIG. 2 shows a block diagram of a system for selecting the set of sample webpages for assessing the accessibility of the websites in accordance with an embodiment of the disclosure.

A network implementation of a system 100 for selecting a sample set of webpages for assessing the accessibility of a websites is shown in FIG. 1 and FIG. 2 according to an embodiment of the disclosure. The system 100 is configured to select a minimum number of sample set of pages such that they can represent the whole websites. The selected sample set of pages provide 100% coverage of the unique elements and functionalities present in the website. The selected sample set of pages then used to test the websites for accessibility requirements. The system 100 is configured to reduce the manual effort required for identifying and selecting sample set of pages.

Although the present disclosure is explained considering that the system 100 is implemented on a server, it may be understood that the system 100 may also be implemented in a variety of computing systems, such as a laptop computer, a desktop computer, a notebook, a workstation, a mainframe computer, a server, a network server, a cloud-based computing environment as shown in FIG. 1. It will be understood that the system 100 may be accessed by multiple users through one or more user devices 102-1, 102-2 . . . 102-N, collectively referred to as user 102 hereinafter, or applications residing on the user devices 102. In one implementation, the system 100 may comprise the cloud-based computing environment in which a user may operate individual computing systems configured to execute remotely located applications. Examples of the user devices 102 may include, but are not limited to, a portable computer, a personal digital assistant, a handheld device, and a workstation. The user devices 102 are communicatively coupled to the system 100 through a network 104.

Referring to FIG. 2, according to an embodiment of the disclosure, the system comprises a processor 106, a memory 108 and a user interface 110. The user interface 110 and the memory 108 are in communication with the processor 106. The processor 106 further includes a plurality of modules. The processor 106 may be implemented as one or more microprocessors, microcomputers, microcontrollers, digital signal processors, central processing units, state machines, logic. Among other capabilities, the at least one processor 106 is configured to fetch and execute computer-readable instructions stored in the memory 108.

The user interface 110 may include a variety of software and hardware interfaces, for example, a web interface, a graphical user interface, and the like. The I/O interface user may allow the system 100 to interact with the user directly or through the client devices 102. Further, the user interface 110 may enable the system 100 to communicate with other computing devices, such as web servers and external data servers (not shown). The user interface 110 can facilitate multiple communications within a wide variety of networks and protocol types, including wired networks, for example, LAN, cable, etc., and wireless networks, such as WLAN, cellular, or satellite. The user interface 110 may include one or more ports for connecting a number of devices including assistive technology devices or adaptive products used by people with disability to one another or to another server.

The memory 108 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Referring to FIG. 2, according to an embodiment of the disclosure, the processor 106 further includes a crawler module 112, an element identification module 114, a classification module 116, an intelligence based module 118 and a rule based engine 120. The crawler module 112 is configured to scan a plurality of webpages present on the websites and gathers necessary information. A number of times, the crawler module 112 is not able to scan the dynamic content present in the websites. For capturing the dynamic content, the system 100 further includes a user input simulation module 122. The user input simulation module 122 records the input from the user before the scanning of the plurality of webpages. Now during the process of scanning, whenever the crawler module 112 goes to the input form, then the crawler module 112 will take input from the user input simulation module 122. After validation, the crawler restarts scanning of the remaining webpages.

The crawler module 112 further uses the element identification module 114 to generate a count of each type of a plurality of web elements present on each of the plurality of webpages. The set of information includes a count of the set of web elements based on the implementation of accessibility.

According to an embodiment of the disclosure, the classification module 116 classifies each of the plurality of webpages into one of a predefined categories. While the intelligence based module 118 classifies the set of web elements into one of the predefined categories. The intelligence based module 118 classifies the set of web elements based on importance from an accessibility point of view and user interaction. It also generates a set of pages that contains a combination of various elements and screens.

According to an embodiment of the disclosure, the following type of web elements would be considered for categorization. The webpage includes various types of images such as decorative, CSS Images, Graph/Chart, Canvas, Image with text, Picture, In-anchor, In-button, Map. The webpages also include form controls. The form control includes required, grouped and related controls of each type of text, email, number, url, password, checkbox, radio, select, text area, submit, button, range. The webpages further include anchors such as external, local, skip, JavaScript etc. The webpages also include tables such as tables, layout, single header, two header, irregular, multi-level header, nested. The webpages further include multimedia such as audio, video without audio, video with Auto play, with default controls, The webpages further include marquee, headings, lists with single element, multi-element and nested elements paragraphs—single, multi-line, only text or text with mark-up. The webpages further include iframes, frameset-frame, objects, embed, applet, block quote, bold, italic, font, base font, meta, menu bar, tree, carousel, CAPTCHA, sliders, date picker. Though it should be appreciated that the type of web elements is not limited only to above mentioned elements, the system can categorize any other type of web elements present on the plurality of webpages.

According to an embodiment of the disclosure, the element identification module 114 also analyses the structure of each of the plurality of webpage and classifies them into one or more of the following predefined categories. Form based category, Static HTML content category, Multimedia based category, Flash & animation based category, Image based category, Frame based category, Table based (layout) category, Data-table based category, Graph/Chart based category, Complex Layout category, Auto updating content category, and Auto reloading/refreshing. The above criteria can be used to construct rules that will allow sampling of pages, such that the sample contains pages and elements of each type defined above that are present in the websites. Though it should be appreciated that the plurality of predefined categories is not limited only to above mentioned elements, the plurality of webpages and the set of web elements can be classified in to other type of predefined categories. The predefined categories are also dependent upon user interaction design and requirement which has influence on accessibility standards.

According to an embodiment of the disclosure, the rule based engine 120 uses the data generated by crawler module 112 to create a sample subset of the complete set of pages. The generated subset represents the complete set in terms of type of elements, set of combination of elements, categories of elements, their occurrences in pages and entire websites and classification of pages. The above criteria can be used by the rule based engine 120 to construct rules that will allow sampling of pages, such that the sample contains pages and elements of each type defined above that are present in the websites.

According to an embodiment of the disclosure, the rule based engine 120 can adopt various approaches for selecting the sample set from the given websites. The process of sample assessment is based on elements, their types, occurrences, type/category/classification of screens. Therefore elements and screens are selected based on their impact on accessibility and user interaction. The invention incorporates all these type of inputs, their combinations, and set of combinations to make decision and generate a sample set of pages.

In an example, the rule based engine 120 creates the sample subset by selecting one page per element (i.e. page that has highest count of that element) and eliminating pages that create redundancy in terms of elements as well as page type.

In another example, the rule based engine 120 creates the sample subset webpages by sorting based on total element count and selecting pages starting from highest count first, such that all type of elements present are covered and redundancy is as low as possible. If any page type is not in the sample, then a page of that type keeping element count as high as possible is included.

In another example, the rule based engine 120 creates the sample subset webpages by finding similar pages; i.e. pages with same type of elements and same page type. The rule based engine 120 keeps the pages with highest count only and optimize the remaining set of pages such that redundancy is minimum.

In addition to this, some guidelines also require human judgment for validation. The sampling criteria has to be such that maximum possible aspects are covered in the sample. With the classification criteria defined in our invention, almost all of the guidelines requiring human judgment can be covered.

Figure 3:
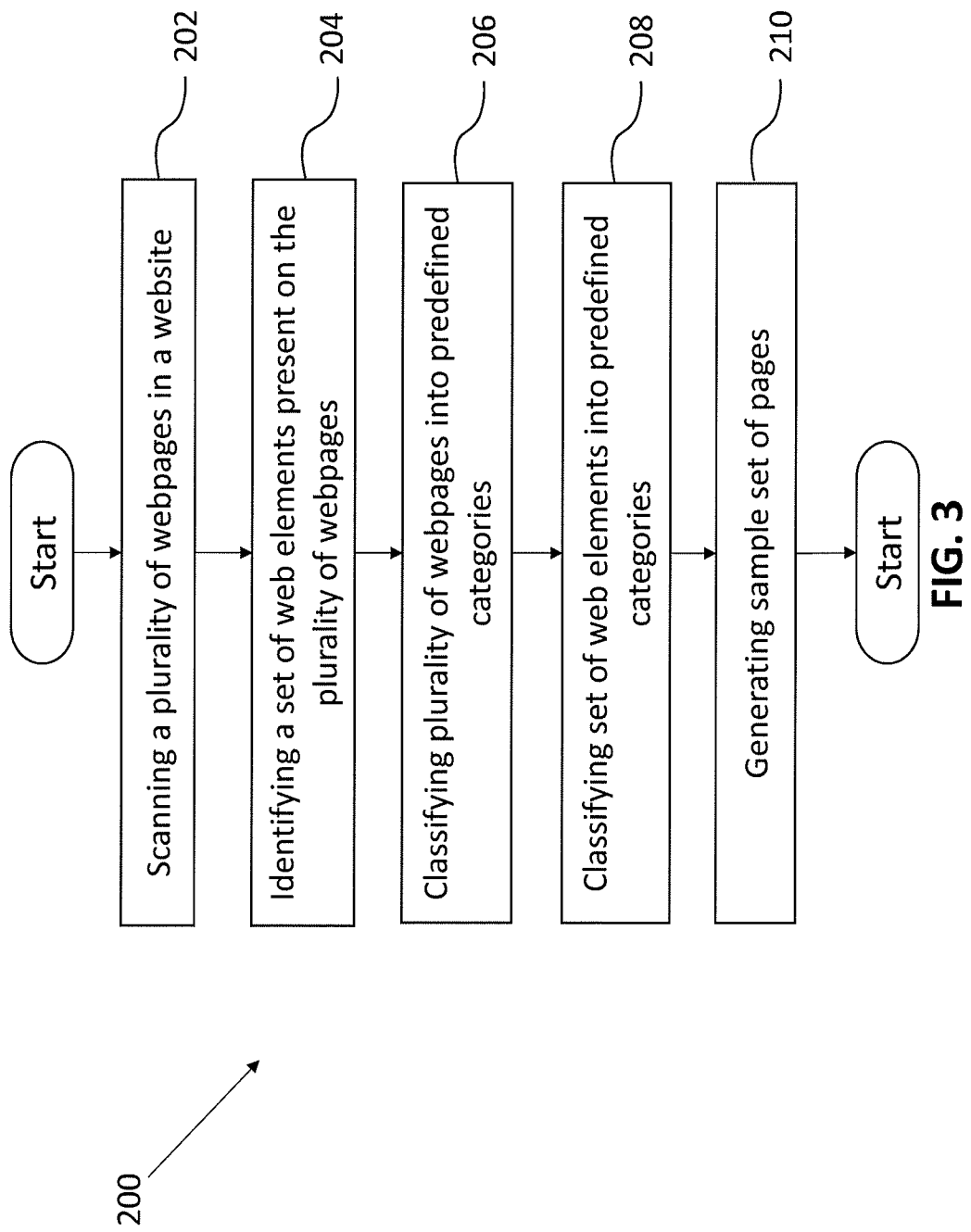
FIG. 3 shows a flowchart illustrating a method for selecting the set of sample webpages for assessing the accessibility of the websites in accordance with an embodiment of the disclosure.

A flowchart 200 illustrating the steps involved in selecting the sample set of pages for assessing the accessibility of the websites is shown in FIG. 3 according to an embodiment of the disclosure. Initially at step 202, the plurality of webpages on the websites is scanned using the crawler module 112. The scanning results in gathering of the necessary information about the websites. In the next step 204, the set of web elements are identified which are present in the plurality of webpages using the element identification module 114. In the next step 206, the plurality of webpages are classified into the predefined categories using the classification module 116. At step 208, each of the set of web elements, which are identified at step 204 are then classified in to the predefined categories using the intelligence based module 118. And finally at step 210, the sample set of pages are generated based on a predefined rule using the rule based engine 120. The predefined rule is constructed based on the predefined categories and the sample set of pages contains a combination of various web elements and the plurality of webpages. The predefined rule takes into consideration the type and occurrence of elements. Basic HTML elements as well as widgets such as menu bar, slider, date picker, etc. are also considered. Large element as well as page classification criteria. Element and page structure based in contrast to content based.

According to another embodiment of the disclosure, the system can be further extended into many areas such as effort estimation, accessibility compliance estimation, determining the capability and skill set required to test the websites manually.

In view of the foregoing, it will be appreciated that the present disclosure provides a method and system for selecting the set of sample webpages for assessing the accessibility of the websites. The preceding description has been presented with reference to various embodiments. Still, it should be understood that the foregoing relates only to the exemplary embodiments of the present invention, and that numerous changes may be made thereto without departing from the spirit and scope of the invention as defined by the following claims.

What is claimed is:

1. A method for selecting a sample set of pages for assessing the accessibility of a website, the method comprising a processor implemented steps of:
    scanning a plurality of webpages present in the websites using a crawler module, and generating a set of information, wherein the set of information includes a count of a set of web elements;
    identifying the set of web elements present on the plurality of webpages based on the set of information using an element identification module, wherein the set of webpages comprises at least one of a minimum number of images, multimedia, iframes, Frameset-frame, and objects, wherein the set of web elements includes form controls, anchors, tables, marquee, headings, lists, paragraphs, embed, applet, block quote, bold, italic, font, meta, menu bar, tree, CAPTCHA, carousal, sliders or date picker, wherein the set of web elements covers different type of accessibility implementation and standard compliance and wherein the identifying comprises analyzing a structure of each of the plurality of webpages;
    classifying each of the plurality of webpages into one of a predefined categories using a classification module;
    classifying the set of web elements into one of the predefined categories based on importance from an accessibility point of view and user interaction using an intelligence based module; and
    generating a sample set of pages based on a predefined rule using a rule based module, wherein the predefined rule is constructed based on the predefined categories, wherein the sample set of pages contains webpages from similar webpages with highest count of the set of web elements, wherein the similar webpages include same type of elements and same type of webpage.

2. The method of claim 1, wherein the sample set of pages representing the plurality of webpages present in the website providing coverage as per standard compliance.

3. The method of claim 1, wherein the count of the set of web elements is based on the implementation of accessibility.

4. The method of claim 1, wherein the predefined categories include at least one of a form based category, a static HTML content category, a multimedia based category, a flash & animation based category, an image based category, a frame based category, a table based category, a data-table based category, a graph/Chart based category, a complex layout category, an auto updating content category or an auto reloading/refreshing category.

5. The method of claim 1 wherein the sample set of pages representing the plurality of webpages in terms of the type of web elements, a set of combination of the web elements, categories of the web elements, occurrences of the web elements in the plurality of webpages and entire website and classification of the plurality of webpages.

6. The method of claim 1, wherein the classification of the plurality of webpages is done based on implication of accessibility guidelines and a user interaction with and without assistive technology.

7. A system for selecting a sample set of pages for assessing the accessibility of a website, the system comprising:
  a memory; and
  a processor coupled to the memory, wherein the processor executes computer readable instructions stored in the memory, the processor comprising;
  a crawler module configured to scan a plurality of webpages present in the websites and generate a set of information, wherein the set of information includes a count of a set of web elements;
  an element identification module configured to identify the set of web elements present on the plurality of webpages based on the set of information, wherein the set of webpages comprises at least one of a minimum number of images, multimedia, iframes, Frameset-frame, and objects, wherein the set of web elements includes form controls, anchors, tables, marquee, headings, lists, paragraphs, embed, applet, block quote, bold, italic, font, meta, menu bar, tree, CAPTCHA, carousal, sliders or date picker, wherein the set of web elements covers different type of accessibility implementation and standard compliance and wherein the identifying comprises analyzing a structure of each of the plurality of webpages;
  a classification module configured to classify each of the plurality of webpages in to one of a predefined categories;
  an intelligence based module configured to classify the set of web elements into one of the predefined categories based on importance from an accessibility point of view and user interaction; and
  a rule based engine configured to generate a sample set of pages based on a predefined rule, wherein the predefined rule is constructed based on the predefined categories, wherein the sample set of pages contains webpages from similar webpages with highest count of the set of web elements, wherein the similar webpages include same type of elements and the same type of webpage.

8. The system of claim 7 further includes a user input simulation module for scanning a dynamic content of the website.

9. A non-transitory computer-readable medium having embodied thereon a computer program for selecting a sample set of pages for assessing the accessibility of a website, the method comprising a processor implemented steps of:
  scanning a plurality of webpages present in the websites using a crawler module, and generating a set of information, wherein the set of information includes a count of a set of web elements;
  identifying the set of web elements present on the plurality of webpages based on the set of information using an element identification module, wherein the set of webpages comprises at least one of a minimum number of images, multimedia, iframes, Frameset-frame, and objects, wherein the set of web elements includes form controls, anchors, tables, marquee, headings, lists, paragraphs, embed, applet, block quote, bold, italic, font, meta, menu bar, tree, CAPTCHA, carousal, sliders or date picker, wherein the set of web elements covers different type of accessibility implementation and standard compliance and wherein the identifying comprises analyzing a structure of each of the plurality of webpages;
  classifying each of the plurality of webpages into one of a predefined categories using a classification module;
  classifying the set of web elements into one of the predefined categories based on importance from an accessibility point of view and user interaction using an intelligence based module; and
  generating a sample set of pages based on a predefined rule using a rule based module, wherein the predefined rule is constructed based on the predefined categories, wherein the sample set of pages contains webpages from similar webpages with highest count of the set of web elements, wherein the similar webpages include same type of elements and the same type of webpage.

* * * * *